(12) United States Patent
Al Maslamani et al.

(10) Patent No.: US 10,973,213 B2
(45) Date of Patent: Apr. 13, 2021

(54) MARINE CLUTCH APPARATUS

(71) Applicant: QATAR UNIVERSITY, Doha (QA)

(72) Inventors: Ibrahim Al Maslamani, Doha (QA); Mehmet Demirel, Doha (QA); David Smyth, Doha (QA); Bruno Weltergiraldes, Doha (QA); Mark Chatting, Doha (QA)

(73) Assignee: QATAR UNIVERSITY, Doha (QA)

( * ) Notice: Subject to any disclaimer, the term of this patent is extended or adjusted under 35 U.S.C. 154(b) by 406 days.

(21) Appl. No.: 16/030,250

(22) Filed: Jul. 9, 2018

(65) Prior Publication Data

US 2020/0008409 A1 Jan. 9, 2020

(51) Int. Cl.
| | |
|---|---|
| *A01K 79/00* | (2006.01) |
| *F16B 45/06* | (2006.01) |
| *B63C 11/20* | (2006.01) |
| *B63C 11/50* | (2006.01) |
| *F16L 1/24* | (2006.01) |

(52) U.S. Cl.
CPC ............ *A01K 79/00* (2013.01); *B63C 11/20* (2013.01); *B63C 11/50* (2013.01); *F16B 45/06* (2013.01); *F16L 1/24* (2013.01)

(58) Field of Classification Search
CPC ......... A01K 79/00; F16B 45/00; F16B 45/06; B63C 11/00; B63C 11/20; B63C 11/50; F16L 1/00; F16L 1/24; H02G 1/00; H02G 1/10; B63B 21/00; B63B 21/38
USPC .............. 114/222, 297, 298, 302, 307, 310
See application file for complete search history.

(56) References Cited

U.S. PATENT DOCUMENTS

| | | |
|---|---|---|
| 2,007,667 A | 7/1935 | Stubbs |
| 3,097,874 A | 7/1963 | Brockbank |
| 4,945,850 A | 8/1990 | Steinhoff |
| 6,092,484 A | 7/2000 | Babin et al. |
| 6,606,829 B2 | 8/2003 | Benincasa et al. |
| 2015/0101524 A1 | 4/2015 | Pence |

FOREIGN PATENT DOCUMENTS

WO WO-8300126 A1 * 1/1983 ............ B63B 21/22

OTHER PUBLICATIONS

International Search Report and Written Opinion issued in Corresponding International Application No. PCT/IB2018/060550 dated Apr. 16, 2019.

* cited by examiner

*Primary Examiner* — Lars A Olson
(74) *Attorney, Agent, or Firm* — Squire Patton Boggs (US) LLP

(57) ABSTRACT

Certain embodiments may generally relate to a marine clutch apparatus for retrieving lines from the seafloor. The marine clutch apparatus may include a first base sled and a second base sled disposed adjacent to each other. The marine clutch apparatus may also include a first side panel and a second side panel, a connection rod disposed between the first base sled and the second base sled, and a grabber head disposed between the first base sled and the second base sled.

12 Claims, 14 Drawing Sheets

MARINE CLUTCH APPARATUS

FIELD OF THE INVENTION

The present invention generally relates to a marine clutch apparatus, and more specifically, to an apparatus for retrieving lines from the seafloor.

BACKGROUND OF THE INVENTION

Generally, fishermen may implement various means to catch fish and/or other forms of sea life. As one method, fishermen may deploy traps onto the seafloor. To ensure convenient retrieval, the traps from the seafloor may often be connected to each other via a line. After settling on the seafloor, and when it is desired to retrieve the traps, fishermen have used clutches. The conventional clutches used by fishermen are often very heavy, made of cast iron, and have multiple hooks displaced around the clutch. Thus, when the clutch is deployed, it may cause irreversible damage to the seafloor as it is being dragged along the seafloor. Such damage may include for example, damage to coral reef beds, seagrass meadows, and seaweeds. Moreover, such retrieval methods destroy or damage the very seafloor habitats and ecosystems where fishes and many other marine life reside.

There is a need, therefore, for an improved clutch apparatus that when deployed, is environmentally friendly, capable of minimizing damage to the seafloor, moves smoothly and efficiently over the seafloor, and is capable of easily grabbing lines and/or ropes over various types of terrain.

SUMMARY OF THE INVENTION

According to certain embodiments, a marine clutch for retrieving a line on the seafloor may include a first base sled and a second base sled disposed adjacent to each other. The marine clutch may also include a first side panel and a second side panel. In an embodiment, the first side panel may be attached within a first hollow space defined by the first base sled, and the second side panel may be attached within a second hollow space defined by the second base sled. The marine clutch may further include a connection rod disposed between the first base sled and the second base sled. In an embodiment, the connection rod may be attached to the first side panel and the second side panel. In addition, the marine clutch may include a grabber head disposed between the first base sled and the second base sled. In an embodiment, the grabber head may be attached, at an attachment end, to the first side panel and the second side panel, and the grabber head may include a first hook and a second hook.

In another embodiment, the grabber head may include a neck portion that is disposed between the first hook and the second hook. In a further embodiment, the grabber head may include a first swing arm and a second swing arm, and in another embodiment, the first swing arm may be attached to the attachment end and extends along one side of the neck portion. According to an embodiment, the second swing arm may be attached to the attachment end and extend along another side of the neck portion. In another embodiment, the first swing arm may be configured to open and close an opening defined by the first hook of the grabber head. In an embodiment, the second swing arm may be configured to open and close another opening defined by the second hook of the grabber head.

In an embodiment, the marine clutch is made of iron. In another embodiment, the marine clutch may include a first bolt that threads through a hole defined by a clutch attachment end of the connection rod, and the first bolt may be fastened to the first side panel and the second side panel. In a further embodiment, the marine clutch may include a second bolt, the second bolt may be threaded through a hole defined by the attachment end of the grabber head, and the second bolt may be fixed to the first side panel and the second side panel.

According to certain embodiments, a method for retrieving a line on a seafloor may include attaching one end of a cord to a connection rod of a marine clutch. The method may also include attaching an opposite end of the cord to a vessel, deploying the marine clutch onto the seafloor, and pulling, with the vessel, the marine clutch by the connection rod along the seafloor.

In an embodiment, the marine clutch may include a first base sled and a second base sled disposed adjacent to each other. The marine clutch may also include a first side panel and a second side panel. In an embodiment, the first side panel may be attached within a first hollow space defined by the first base sled, and the second side panel may be attached within a second hollow space defined by the second base sled. The marine clutch may also include a grabber head disposed between the first base sled and the second base sled. In an embodiment, the grabber head may be attached, at an attachment end, to the first side panel and the second side panel, and the grabber head may include a first hook and a second hook. In addition, the connection rod may be disposed between the first base sled and the second base sled, and the connection rod may be attached to the first side panel and the second side panel.

In an embodiment, the method may also include catching the line on the seafloor with the grabber head. In another embodiment, the grabber head may include a neck portion that is disposed between the first hook and the second hook. In a further embodiment, the method may include securing the line after it is caught with either a first swing arm or a second swing arm. In an embodiment, the first swing arm may be attached to the attachment end and extend along one side of the neck portion. In another embodiment, the second swing arm may be attached to the attachment end and extend along another side of the neck portion. In a further embodiment, the first swing arm may be configured to open and close an opening defined by the first hook of the grabber head, and the second swing arm may be configured to open and close another opening defined by the second hook of the grabber head.

In another embodiment, the marine clutch may be made of iron. In a further embodiment, the marine clutch may include a first bolt that threads through a hole defined by a clutch attachment end of the connection rod, and fastened to the first side panel and the second side panel. In another embodiment, the marine clutch may include a second bolt, and the second bolt may be threaded through a hole defined by the attachment end of the grabber head. Further, the second bolt may be fixed to the first side panel and the second side panel.

According to certain embodiments, a method of assembling a marine clutch may include connecting a first base sled with a second base sled. In an embodiment, the first base sled and the second base sled may be connected adjacent to each other. The method may also include attaching a first side panel within a first hollow space defined by the first base sled. The method may further include attaching a second side panel within a second hollow space defined by the second base sled. In addition, the method may include attaching a connection rod to the first side panel and the second side panel. In an embodiment, the connection rod may be attached between the first base sled and the second base sled. The method may also include attaching a grabber head to the first side panel and the second side panel.

In an embodiment, the grabber head may be attached between the first side panel and the second side panel, and the grabber head may include a first hook and a second hook. In another embodiment, the grabber head may be attached to the first side panel and the second side panel at an attachment end of the grabber head. In a further embodiment, the grabber head may include a neck portion that is disposed between the first hook and the second hook. In a further embodiment, the method may include attaching a first swing arm to the attachment end, the first swing arm extending along one side of the neck portion, and attaching a second swing arm to the attachment end, where the second swing arm may extend along another side of the neck portion. In an embodiment, the first swing arm may be configured to open and close an opening defined by the first hook of the grabber head, and the second swing arm may be configured to open and close another opening defined by the second hook of the grabber head.

In an embodiment, the marine clutch may be made of iron. In another embodiment, the method may include threading a first bolt through a hole defined by a clutch attachment end of the connection rod, and fastening the first bolt to the first side panel and the second side panel. The method may also include fixing a second bolt to the first side panel and the second side panel. In an embodiment, the second bolt may be threaded through a hole defined by the attachment end of the grabber head, and the second bolt may be fixed to the first side panel and the second side panel.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 8(*b*) illustrates a top view of the connection rod of the marine clutch according to certain embodiments

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

DETAILED DESCRIPTION OF THE INVENTION

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Certain embodiments may be directed to a marine clutch for retrieving lines or ropes from the seafloor that are connected to traps. In certain embodiments, the traps collected by the marine clutch may be metal traps. However, in other embodiments, the traps may be of different materials than metal, and yet have similar properties and function. In addition, the traps may be of different types, such as, for example gargours and/or garageers.

According to certain embodiments, the marine clutch may be anchored to and deployed from a boat or other similar means of transportation over a body of water. Once deployed, the marine clutch may move smoothly over the seafloor to minimize any harm to the seafloor and marine life. In use, the marine clutch may be deployed and operated over various types of terrain on the seafloor including, for example, sand, rock, gravel, and others.

Figure 1:
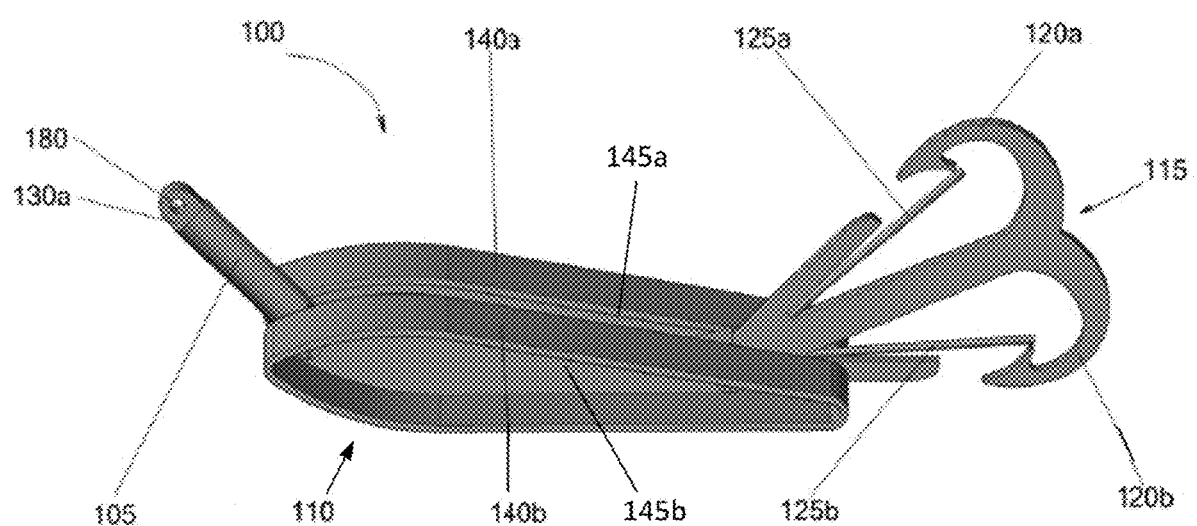
FIG. 1 illustrates a marine clutch according to certain embodiments.
Figure 2:
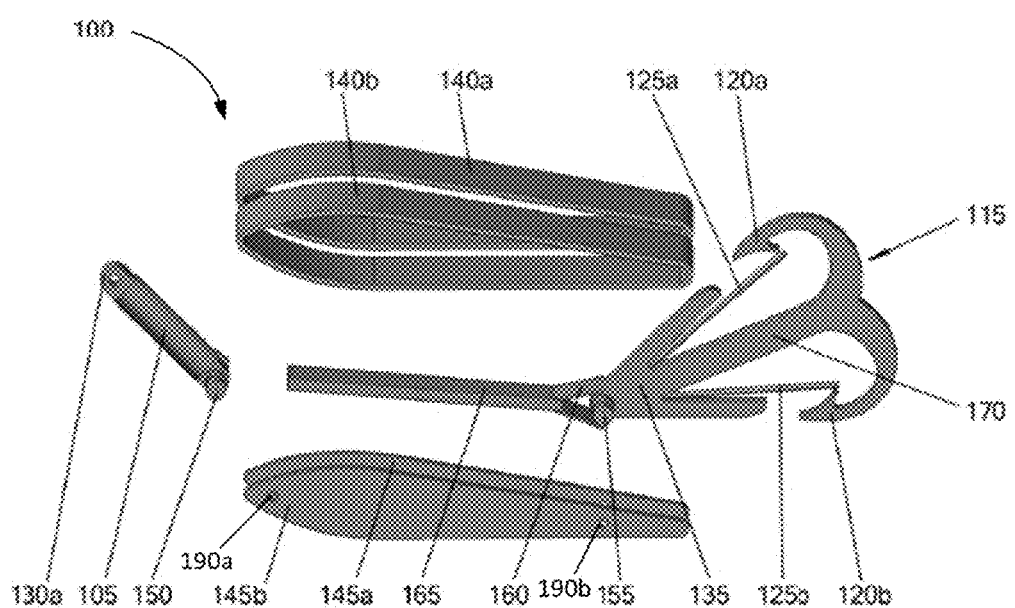
FIG. 2 illustrates an exploded view of the marine clutch of FIG. 1 according to certain embodiments.

FIG. 1 illustrates an exemplary marine clutch 100 according to certain embodiments. In addition, FIG. 2 illustrates an exploded view of the marine clutch 100 of FIG. 1. According to certain embodiments, the marine clutch 100 may be made up of a variety of components. For instance, as illustrated in FIG. 1, the marine clutch 100 may include a body 110. The body 110 may include a first base sled 140*a* and a second base sled 140*b*. In certain embodiments, each of the first base sled 140*a* and the second base sled 140*b* may include a respective side panel first 145*a* and second 145*b*. According to certain embodiments, the side panel 145a may be attached within an interior hollow space defined by the first base sled 140a, and the side panel 145b may be attached within an interior hollow space defined by the second base sled 140b. The attachment of the first and second side panels 145a, 145b may be performed by various means, such as, for example, welding. In other embodiments, the first base sled 140a and first side panel 145a may be of a unibody design, and the second base sled 140b and second side panel 145b may also be of a unibody design. According to further embodiments, the plate member 165 may be welded to the joint structure 160, and the plate member 165 and joint structure 160 may be welded to the first and second side panels 145a, 145b.

As illustrated in FIGS. 1 and 2, the marine clutch 100 may also include a connection rod 105. The connection rod 105 may be attached to the first side panel 145a of the first base sled 140a, and may be attached to the second side panel 145b of the second base sled 140b by means of a bolt 150. The bolt 150 may be thread through a hole 185 located at a clutch attachment end 130b of the connection rod 105 described in more detail below. The bolt 150 may also pass through a hole 190a of each side panel 145a and 145b to secure the connection rod 105 to the marine clutch body. Further, the bolt 150 can be tightly secured to the marine clutch 100 by using a nut and washer (not shown) on the opposite end of the head of the bolt 150. According to certain embodiments, use of the bolt 150 may enable the connection rod 105 to rotate about a center axis of the bolt 150. In other embodiments, the washer may help keep the grabber head 115 and connection rod 105 in the middle of the connection line and fill the gap.

At the opposite end of the clutch attachment end 130b, the connection rod 105 may include a line attachment end 130a. The line attachment end 130a may include a corresponding hole 180 through which one end of a rope (or other similar means such as, for example, flexible string or cordage) may pass through and be tied to the connection rod 105. The other end of the rope may therefore be tied to a boat or traveling vessel. According to certain embodiments, the connection rod 105 may enable the marine clutch 100 to be deployed from a boat and pulled along the seafloor by the rope tied to the connection rod 105.

As illustrated in FIGS. 1 and 2, the marine clutch 100 may further include a grabber head 115. According to certain embodiments, the grabber head 115 may be attached to the marine clutch 100 at an end that is opposite to the location of where the connection rod 105 is attached. The grabber head 115 may include hooks 120a, 120b, and a neck 170 that separates the two hooks 120a, 120b. In certain embodiments, the grabber head 115 may of a unibody design.

The grabber head 115, as illustrated in FIGS. 1 and 2, may include swing arms 125a, 125b for each corresponding hook 120a, 120b. According to certain embodiments, the swing arms 125a, 125b may be attached at an attachment end 135 of the grabber head 115, and configured to open inwards toward the neck 170 to enable the hooks 120a, 120b to retrieve a line off the seafloor. Once the line on the seafloor has been retrieved, the swing arms 125a, 125b may be configured to swing back toward the hooks 120a, 120b to close the opening and prevent the retrieved line from being released from the grabber head 115.

In certain embodiments, the swing arms 125a, 125b may be made of 3 mm hardened steel rods. Further, according to certain embodiments, the swing arms 125a, 125b may be welded to the attachment end 135 of the grabber head 115.

As illustrated in FIG. 2, the grabber head 115 may be attached to the marine clutch 100 at both first and second side panels 145a, 145b via a bolt 155. The bolt 155 may pass through a hole 175 (illustrated in FIG. 7 described below) of the grabber head 115, and also pass through a hole 190b on each of the first and second side panels 145a, 145b. The bolt 155 can be tightly secured to the marine clutch 100 by using a nut and washer (not shown) the opposite end of the head of the bolt 155. According to certain embodiments, use of the bolt 155 may enable the grabber head 115 to freely rotate around a center axis of the bolt 155.

As further illustrated in FIG. 2, the attachment end 135 of the grabber head 115 may include a joint structure 160 attached thereto. In certain embodiments, the joint structure 160 may be configured to limit the swing angle of the grabber head 115. In other embodiments, the joint structure 160 may strengthen the joint between the outer face of side panels 145a and 145b. Attached to the joint structure 160 may be a plate member 165. According to certain embodiments, both the joint structure 160 and plate member 165 may be attached to respective outer faces of the first and second side panels 145a, 145b. In certain embodiments, the joint structure 160 and plate member 165 may be attached to the respective outer faces of the first and second side panels 145a, 145b by being welded together. The plate member 165 may be welded to the joint structure 160. However, other means of attachment may be implemented in other embodiments. In certain embodiments, the plate member 165 and joint structure 160 may join the side panels 145a and 145b. According to certain embodiments, the plate member 165 and joint structure 160 may be joined to the side panels 145a and 145b by welding. In addition, a bolt 155 may be provided to hold and enable rotation of the grabber head 115.

Figure 3:
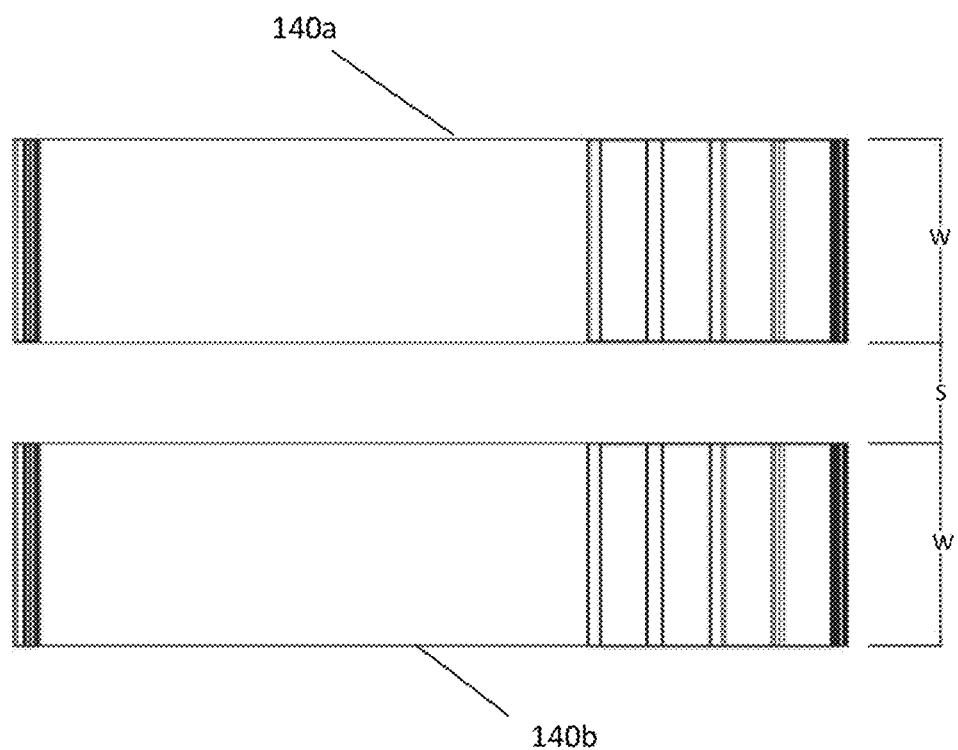
FIG. 3 illustrates a top view of first and second base sleds of the marine clutch according to certain embodiments.

FIG. 3 illustrates a top view of first and second base sleds 140a, 140b of the marine clutch 100 according to certain embodiments. According to certain embodiments, each of the first and second base sleds 140a, 140b may have width W of about 100 mm. In other embodiments, the first base sled 140a and the second base sled 140b may be spaced apart at a distance S of about 50 mm when the marine clutch 100 is fully assembled.

Figure 4:
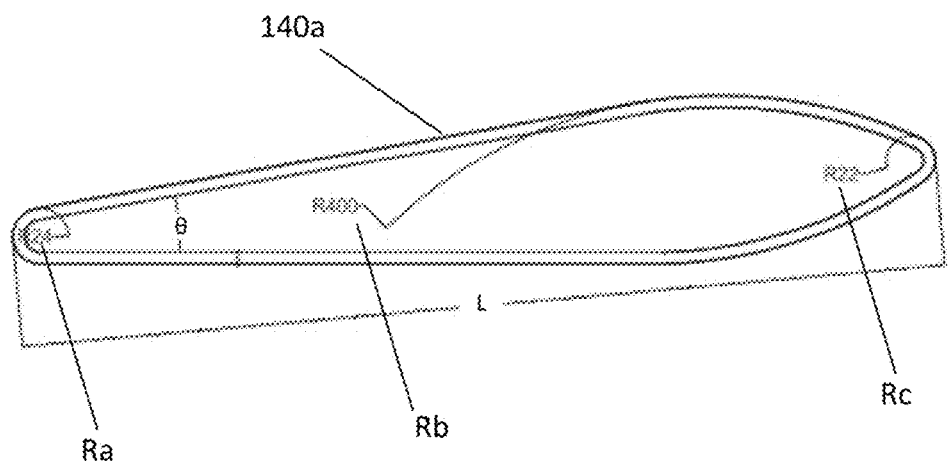
FIG. 4 illustrates a side view of one of the base sleds of the marine clutch according to certain embodiments.

FIG. 4 illustrates a side view of the first base sled 140a of the marine clutch 100 according to certain embodiments. For simplicity, the same configurations of the first side panel 145a and first base sled 140a are applicable to the second side panel 145b and second base sled 140b of the marine clutch 100. As illustrated in FIG. 4, first base sled 140a may be formed to have an angle θ located at an end of where the bolt 155 attaches to the grabber head 115. According to certain embodiments, the angle θ may be about 10°. As further illustrated in FIG. 4, the first base sled 140a may have a length L of about 400 mm. As also illustrated in FIG. 4, the first and second base sleds 140a, 140b may have multiple bending radiuses Ra, Rb, Rc of the curves between tangents. For example, according to certain embodiments, bending radius Ra may be 24 mm, bending radius Rb may be 400 mm, and bending radius Rc may be 22 mm.

Figure 5:
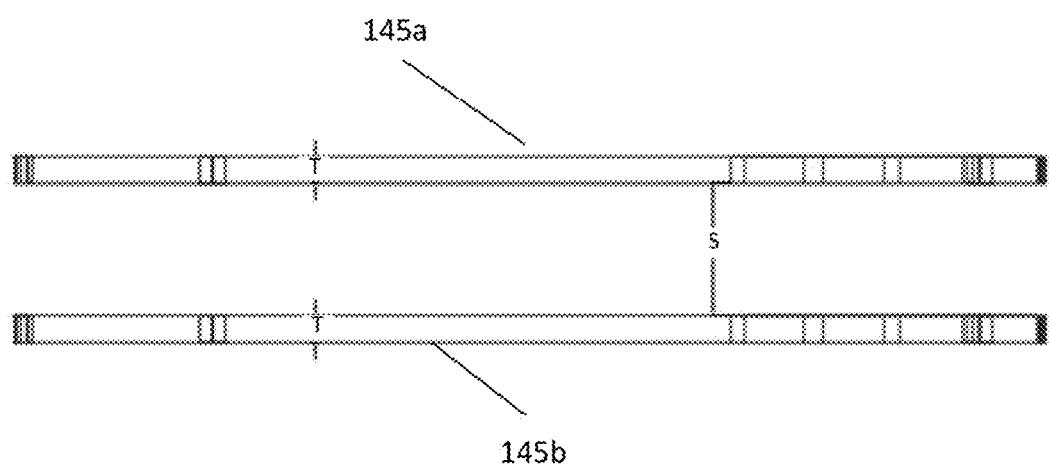
FIG. 5 illustrates a top view of the side panels of the base sleds according to certain embodiments.

FIG. 5 illustrates a top view of the side panels 145a, 145b of the base sleds 140a, 140b according to certain embodiments. As illustrated in FIG. 5, the first side panel 145a and the second side panel 145b may have a thickness T. For instance, according to certain embodiments, the first and second side panels 145a, 145b may have a thickness of about 10 mm. Further, as illustrated in FIG. 5, the first and second side panels 145a, 145b may be spaced apart at a distance S of about 50 mm. This separation distance is similar to that of between the first and second base sleds 140a, 140b illustrated in FIG. 3.

Figure 6:
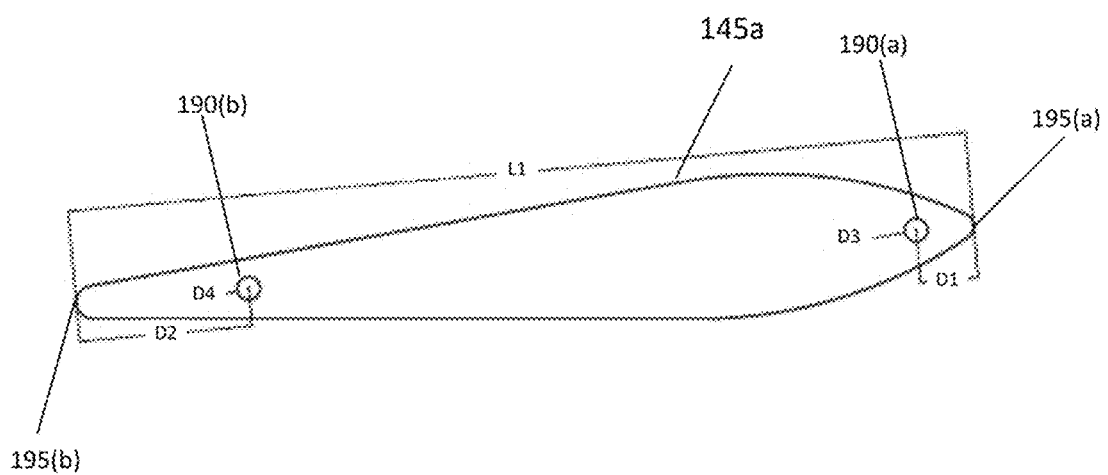
FIG. 6 illustrates a side view of the side panels of the marine clutch of FIGS. 1 and 2 according to certain embodiments

FIG. 6 illustrates a side view of a side panel 145a of the marine clutch 100 of FIGS. 1 and 2 according to certain embodiments. Although only one side panel is illustrated in FIG. 6, the side panel of FIG. 6 may be representative of both the first side panel 145a and the second side panel 145b. As illustrated in FIG. 6, the first and second side panels 145a, 145b may have a length L1 of about 390 mm. In addition, FIG. 6 illustrates that a distance D1 from the center of a hole 190(a) to a first edge 195(a) of the side panels 145a, 145b is about 25 mm. FIG. 6 also illustrates that another distance D2 from the center of a hole 190(b) to a second edge 195(b) of the side panels 145a, 145b is about 75 mm. In addition, FIG. 6 illustrates that the holes 190(a) and 190(b) may have respective diameters D3 and D4. According to certain embodiments, the diameters D3 and D4 may be about 10 mm.

Figure 7:
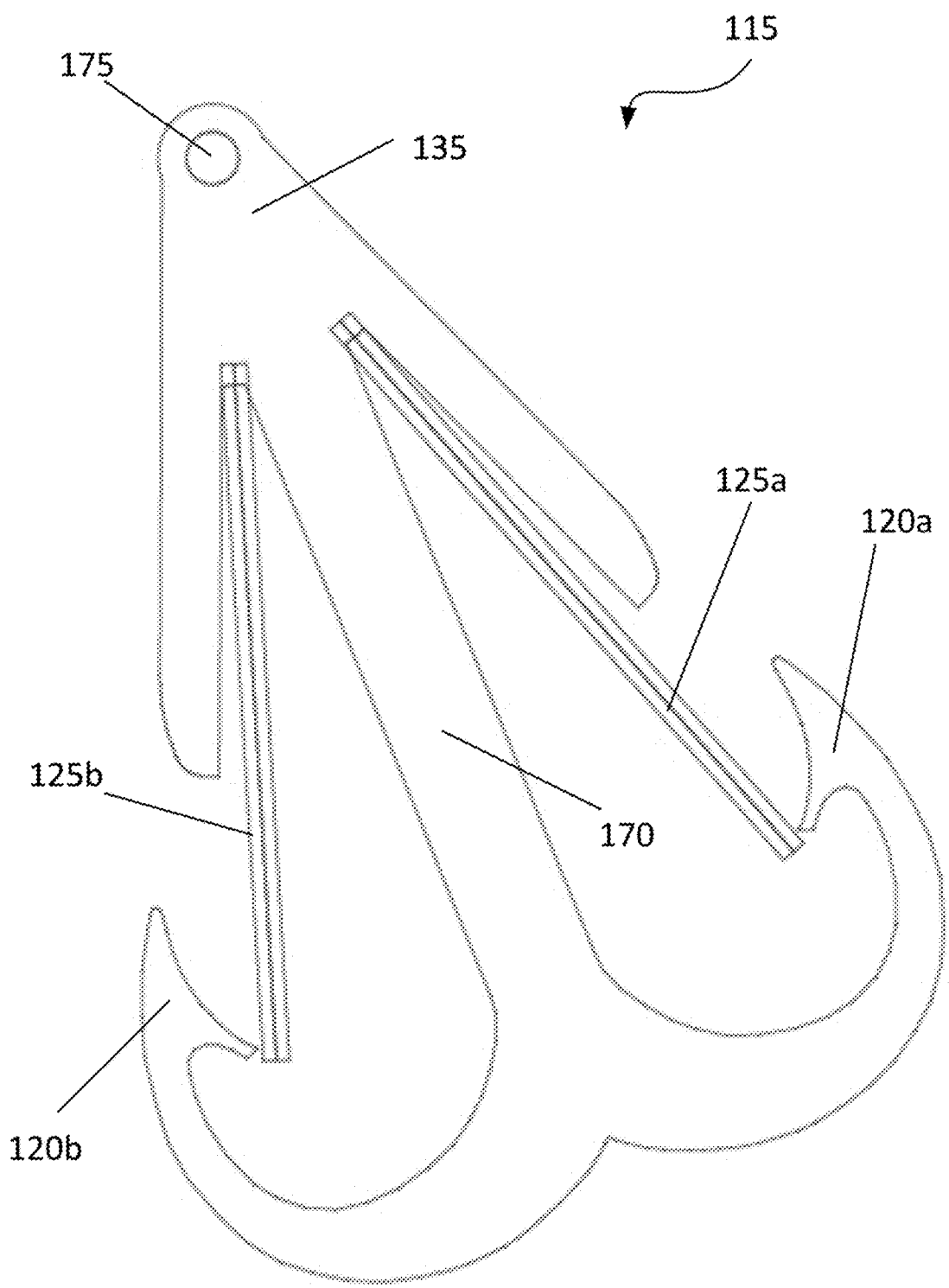
FIG. 7 illustrates a grabber head of the marine clutch according to certain embodiments.

FIG. 7 illustrates an exemplary grabber head 115 of the marine clutch 100 according to certain embodiments. As noted previously, the grabber head 115 may include hooks 120a, 120b. Near each hook 120a, 120b, the grabber head 115 may include respective swing arms 125a, 125b. According to certain embodiments, the swing arms 125a, 125b may be configured to swing open (toward the neck 170) and close (toward the hooks 120a, 120b) so that a line may be entrapped within the opening defined by the hooks 120a, 120b. Further, as illustrated in FIG. 7, one end of the each swing arm 125a, 125b may be connected to an attachment end 135 of the grabber head 115. In addition, the grabber head 115, according to certain embodiments, may include a hole 175 near the attachment end 135 for which a bolt 155 may pass through to connect the grabber head 115 to the first and second base sleds 140a, 140b.

Figure 8A:
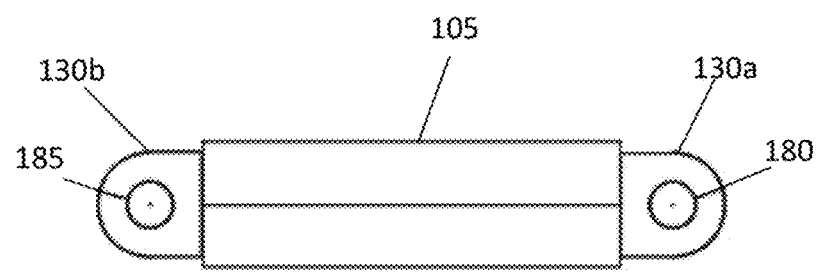
FIG. 8(*a*) illustrates a connection rod of the marine clutch according to certain embodiments.
Figure 8B:
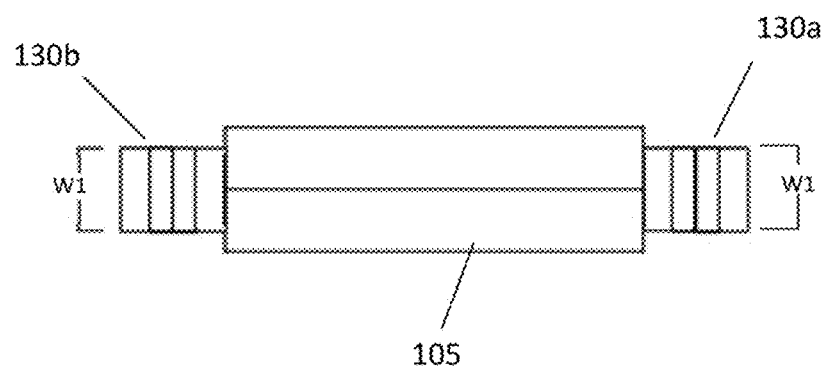

FIG. 8(a) illustrates a connection rod 105 of the marine clutch 100 according to certain embodiments. Further, FIG. 8(b) illustrates a top view of the connection rod 105 of FIG. 8(a). As illustrated in FIG. 8(a), the connection rod 105 may include a line attachment end 130a. The line attachment end 130a may include a corresponding hole 180 to enable a rope or line to be tied to the connection rod 105. As further illustrated in FIG. 8(a), the connection rod 105 may include a clutch attachment end 130b. The clutch attachment end 130b may be located on an opposite end of the connection rod 105 with respect to the line attachment end 130a. According to certain embodiments, the clutch attachment end 130b may include a respective hole 185, which may enable the clutch attachment end 130b to be attached to the first and second side panels 145a, 145b by means of a bolt 150 extending through the hole 185. Further, FIG. 8(b) illustrates that the line attachment end 130a and the clutch attachment end 130b may have a width W1. In certain embodiments, the width W1 may be about 20 mm.

According to certain embodiments, the components of the marine clutch 100 described herein may be made of iron. For instance, the first and second base sleds 140a, 140b, first and second side panels 145a, 145b, connection rod 105, grabber head 115, plate member 165, and joint structure 160 may all be made of iron. However, in other embodiments, the marine clutch 100 may be made of other metallic materials that provide similar advantages as with iron. For example, the connection rod 105 and grabber head 115 may be made of steel.

Figure 9:
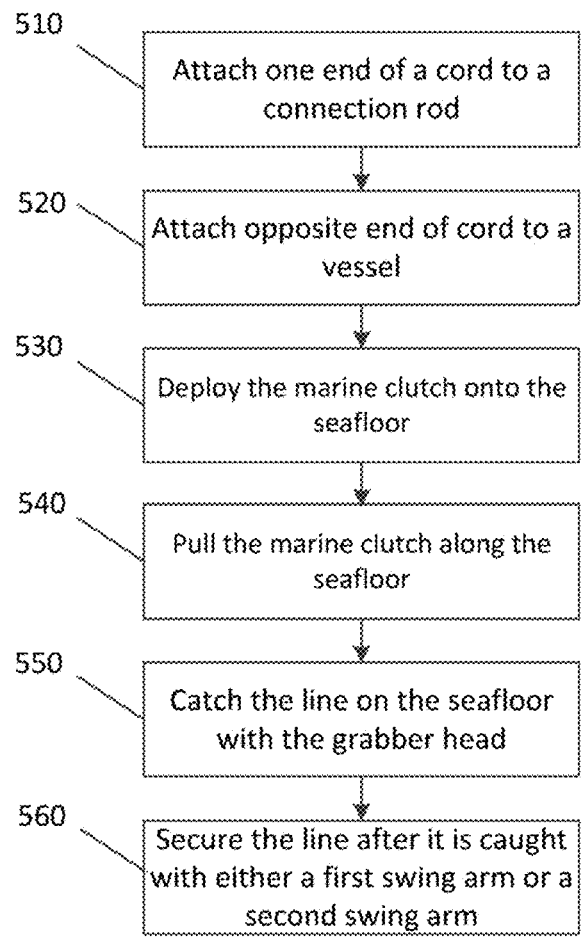
FIG. 9 illustrates a flow diagram according to certain embodiments.

FIG. 9 illustrates a flow diagram according to certain embodiments. Specifically, FIG. 9 illustrates an exemplary method for retrieving a line on a seafloor with a marine clutch according to certain embodiments. At 510, the method may include attaching one end of a cord to a connection rod of the marine clutch. According to certain embodiments, the cord may be a flexible string or rope. At 520, the method may include attaching an opposite end of the cord to a vessel. In certain embodiments, the vessel may be a boat or other vehicle for water travel. At 530, the method may include deploying the marine clutch onto the seafloor. In addition, at 540, the method may include pulling, with the vessel, the marine clutch by the connection rod along the seafloor. Further, at 550, the method may include catching the line on the seafloor with the grabber head of the marine clutch. For instance, the line may be caught with either a first hook or a second hook of the grabber head. At 560, the method may include securing the line after it is caught with either a first swing arm or a second swing arm of the grabber head.

Figure 10:
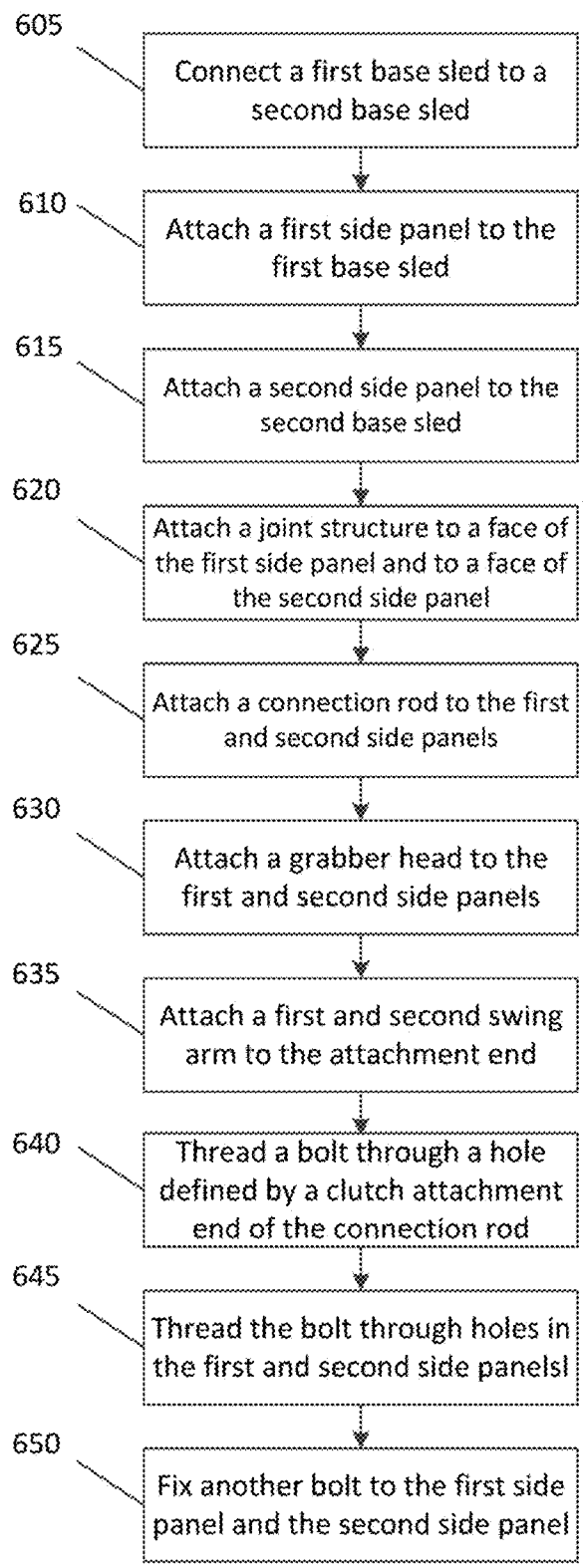
FIG. 10 illustrates another flow diagram according to certain embodiments.

FIG. 10 illustrates another flow diagram according to certain embodiments. Specifically, FIG. 10 illustrates an exemplary method for assembling a marine clutch according to certain embodiments. At 605, the method may include connecting a first base sled with a second base sled. In certain embodiments, the first base sled and the second base sled may be connected adjacent to each other. At 610, the method may include attaching a first side panel within a first hollow space defined by the first base sled. At 615, the method may include attaching a second side panel within a second hollow space defined by the second base sled. At 620, the method may include attaching a joint structure to a face of the first side panel and to a face of the second side panel. At 625, the method may include attaching a connection rod to the first side panel and the second side panel. According to certain embodiments, the connection rod may be attached between the first base sled and the second base sled with a bolt. In certain embodiments, the bolt may be threaded through a hole at the clutch attachment end of the connection rod, and also threaded through the first side panel and the second side panel. At 630, the method may include attaching a grabber head to the first side panel and the second side panel. According to certain embodiments, the grabber head may be attached between the first side panel and the second side panel with a bolt. In further embodiments, the grabber head may include a first hook and a second hook. In other embodiments, the grabber head may be attached to the first side panel and the second side panel at an attachment end of the grabber head.

As further illustrated in FIG. 10, at 635, the method may include attaching a first swing arm and a second swing arm to the attachment end of the grabber head. In certain embodiments, the first swing arm may extend along one side of a neck portion of the grabber head. In certain embodiments, the second swing arm may extend along another side of the neck portion. At 640, the method may include threading a bolt through a hole defined by a clutch attachment end of the connection rod. At 645, the method may include threading the bolt through holes on the first side panel and the second side panel. In addition, at 650, the method may include fixing another bolt to the first side panel and the second side panel.

Figure 11:
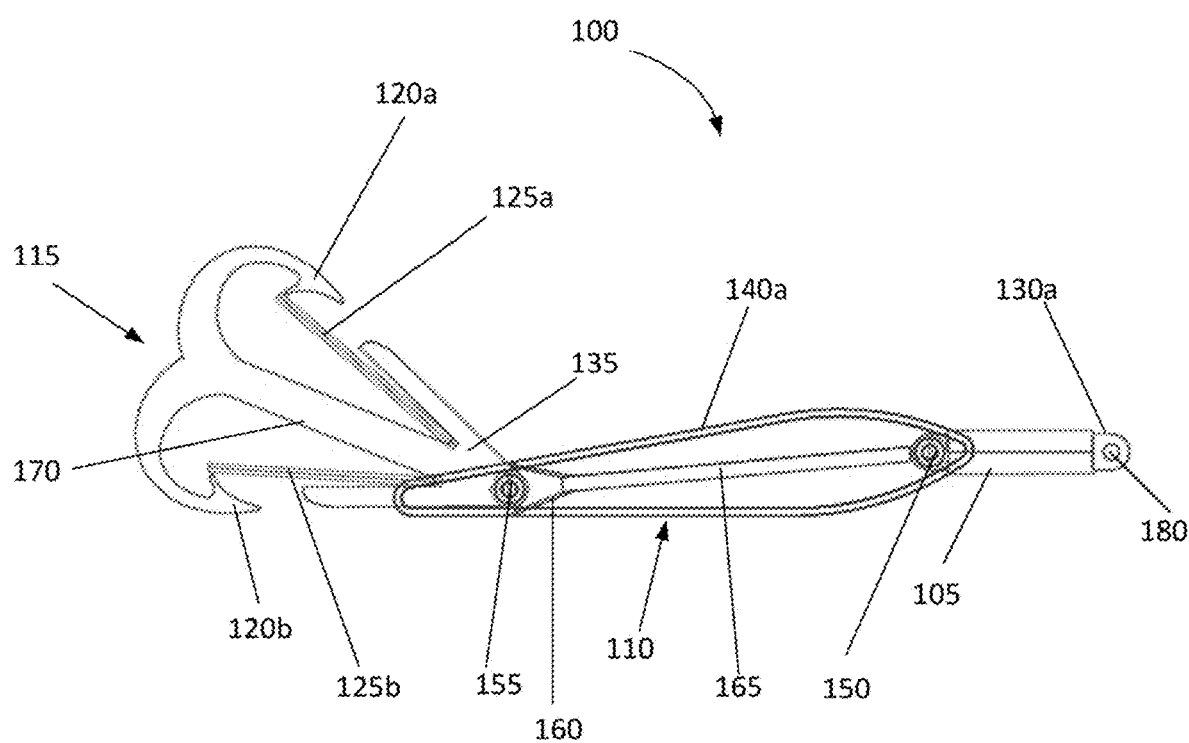
FIG. 11 illustrates the marine clutch of FIG. 1 with another configuration of the plate member according to certain embodiments.
Figure 12:
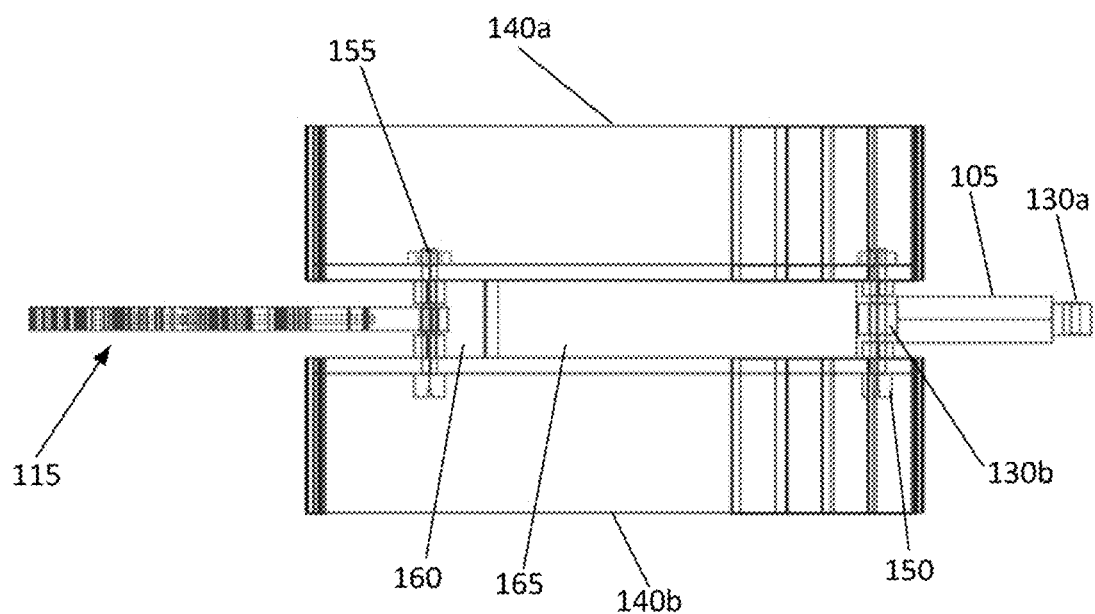
FIG. 12 illustrates a top view of the marine clutch of FIG. 11 according to certain embodiments.

FIG. 11 illustrates the marine clutch of FIG. 1 with another configuration of the plate member according to certain embodiments, and FIG. 12 illustrates a top view of the marine clutch of FIG. 11 according to certain embodiments. According to certain embodiments, the plate member 165 and joint structure 160 may be welded to outer faces of the side panels 145a and 145b. In other embodiments, there may be no connection between the plate member 165 and the connection rod 105, as well as between the joint structure 160 and the grabber head 115. According to certain embodiments, the grabber head 115 and connection rod 105 may be connected to the side panels 145a and 145b by means of the bolts 155 and 150 through holes 190b and 190a respectively. In addition, according to certain embodiments, blank spaces may be filled by washers 152a-b and 157a-b along the bolts 155 and 150.

Figure 13:
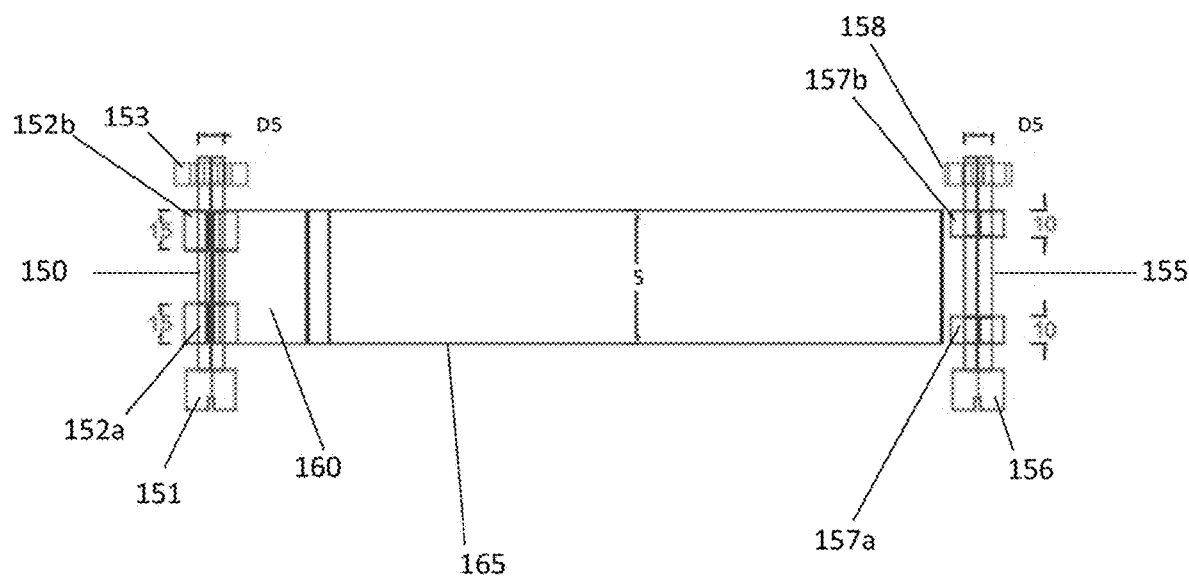
FIG. 13 illustrates a top view of the plate member of the marine clutch of FIG. 11 according to certain embodiments.

FIG. 13 illustrates a top view of the plate member 165 of the marine clutch 100 of FIG. 11 according to certain embodiments. FIG. 13 also illustrates the joint structure 160, bolts 150 and 155, and nuts and washers attached to the bolts 150 and 155. According to certain embodiments, the joint structure 160 may form a limiter for excess swing of the grabber head 115. As illustrated in FIG. 13, the joint structure 160 is attached to one end of the plate member 165. Located at the joint structure 160 is the bolt 150. The bolt 150 may have a bolt head 151, and may be threaded through holes 190a and 185. The bolt 150 may also pass through washers 152a, 152b, and secured with a nut 153 at the opposite end of the bolt head 151.

Additionally, FIG. 13 illustrates bolt 155 located at the opposite end of the plate member 165 with respect to bolt 150. As previously noted, bolt 155 threads through holes 190b and 175. The bolt 155 may also have a bolt head 156, and bolt 155 may pass through washers 157a, 157b. Further, bolt 155 may be secured with a nut 158 at the opposite end of the bolt head 156. According to certain embodiments, the bolts 150 and 155 may have a diameter D5 of about 10 mm. In addition, the washers 152a, 152b may be 15 mm thick washers, and washers 157a, 157b may be 10 mm thick washers. Further, the plate member may have a width of S, which, in certain embodiments, may be about 50 mm. According to other embodiments, the bolts 150 and 155 may be 10 mm×80 mm steel bolts with a slotted round head.

Figure 14:
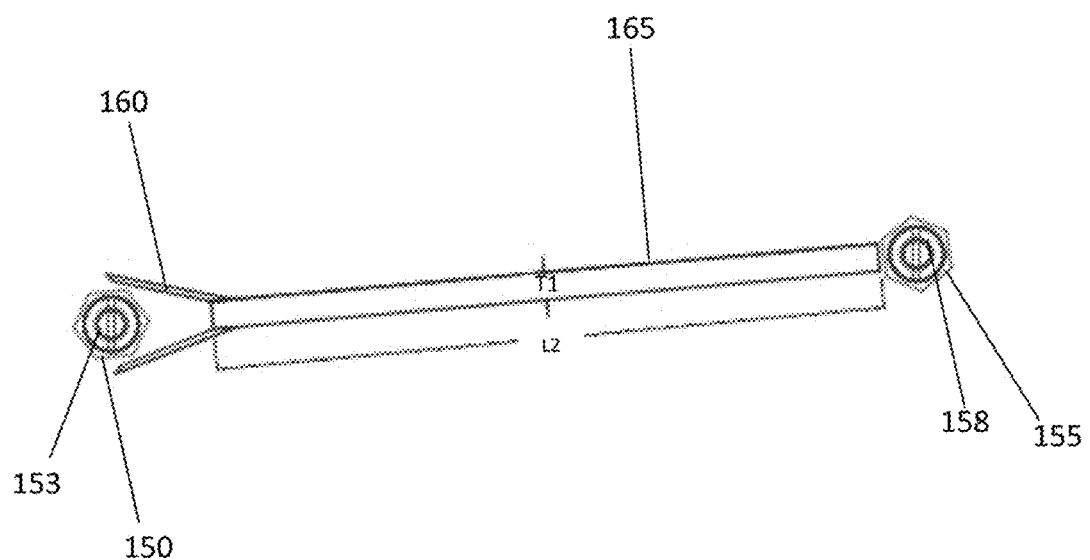
FIG. 14 illustrates a side view of the plate member of the marine clutch of FIG. 11 according to certain embodiments.

FIG. 14 illustrates a side view of the plate member 165, joint structure 160, bolts 150, 155, nuts 153, 158, and washers 152a, 152b, 157a, 157b of the marine clutch of FIG. 11 according to certain embodiments. FIG. 14 also illustrates the joint structure 160, bolts 150, 155, nuts 153, 158, and washers 152a, 152b, 157a, 157b all in line connected form. As illustrated in FIG. 14, the plate member 165 may have a length L2 of about 240. The plate member 165 may also have a thickness T1 of about 10 mm.

According to certain embodiments, the configuration of the marine clutch described herein may provide several technical improvements over conventional clutches. For example, according to certain embodiments, the configuration of the marine clutch 100 allows it to be functionally operable on either side. That is, the marine clutch 100 may travel along the seafloor on either side of the first and second base sleds 140a, 140b. Moreover, the rotatable feature of the connection rod 105 and grabber head 115 allows for equal and adjustable functionality when the marine clutch 100 moves along the seafloor on their side of the first and second base sleds 140a, 140b.

According to certain embodiments, it may also be possible for the marine clutch 100 to glide over the bottom of the seafloor with reduced friction. In doing so, the marine clutch 100 is capable of minimizing destruction of the seafloor, and minimizing damage to seafloor ecosystems and habitats. As such, the marine clutch 100 may be more environmentally friendly than conventional clutches. Moreover, in other embodiments, incorporation of the swing arms 120a, 120b allows for a caught line to be securely caught by the hooks 102a, 120b of the marine clutch 100 so that it will not escape.

According to further embodiments, it may be possible to provide a marine clutch 100 that has a low production cost. It may also be possible to provide a marine clutch 100 that functions efficiently in various types of terrain on the seafloor, while maintaining its capability of catching lines on the seafloor. For instance, in certain embodiments, the marine clutch 100 may be fully operable over rocky or sandy terrains on the seafloor. In other embodiments, the marine clutch 100 may be operable over smooth or substantially flat terrains on the seafloor, and reduces any disturbance to the surrounding environment on the seafloor.

In addition, according to other embodiments, it may be possible to provide a marine clutch 100 that is lightweight so that upon being deployed, the marine clutch 100 can sink softly to the seafloor without damaging the seafloor. In other embodiments, it may be possible to provide a marine clutch 100 wherein the weight of the marine clutch 100 may be adjustably controlled. For instance, in certain embodiments, the weight of the marine clutch 100 may be controlled by the addition or removal of external weight units. In certain embodiments, the weight of the marine clutch 100 may be controlled by installing extra weight by welding or screwing more weight (such as lead) to the internal space inside the internal spaces defined by the left and right base sleds 140a, 140b. Such displacement of weight may be beneficial to taking care of the center of gravity of the marine clutch 100.

Although the foregoing description is directed to the preferred embodiments of the invention, it is noted that other variation and modifications will be apparent to those skilled in the art, and may be made without departing from the spirit or scope of the invention. Moreover, features described in connection with one embodiment of the invention may be used in conjunction with other embodiments, even if not explicitly stated above.

We claim:

1. A marine clutch for retrieving a line on a seafloor, comprising:
   a first base sled and a second base sled disposed adjacent to each other;
   a first side panel and a second side panel, wherein the first side panel is attached within a first hollow space defined by the first base sled, and the second side panel is attached within a second hollow space defined by the second base sled;
   a connection rod disposed between the first base sled and the second base sled, wherein the connection rod is attached to the first side panel and the second side panel; and
   a grabber head disposed between the first base sled and the second base sled, wherein the grabber head is attached, at an attachment end, to the first side panel and the second side panel, and wherein the grabber head comprises a first hook and a second hook,
   wherein the grabber head comprises a neck portion that is disposed between the first hook and the second hook,
   wherein the grabber head comprises a first swing arm and a second swing arm,
   wherein the first swing arm is attached to the attachment end and extends along one side of the neck portion,
   wherein the second swing arm is attached to the attachment end and extends along another side of the neck portion,
   wherein the first swing arm is configured to open and close an opening defined by the first hook of the grabber head, and wherein the second swing arm is configured to open and close another opening defined by the second hook of the grabber head.

2. The marine clutch according to claim 1, wherein the marine clutch is made of iron.

3. The marine clutch according to claim 1,
wherein the marine clutch comprises a first bolt that threads through a hole defined by a clutch attachment end of the connection rod, and
wherein the first bolt is fastened to the first side panel and the second side panel.

4. The marine clutch according to claim 1,
wherein the marine clutch comprises a second bolt,
wherein the second bolt is threaded through a hole defined by the attachment end of the grabber head, and
wherein the second bolt is fixed to the first side panel and the second side panel.

5. A method for retrieving a line on a seafloor, comprising:
attaching one end of a cord to a connection rod of a marine clutch;
attaching an opposite end of the cord to a vessel;
deploying the marine clutch onto the seafloor; and
pulling, with the vessel, the marine clutch by the connection rod along the seafloor;
wherein the marine clutch comprises
  a first base sled and a second base sled disposed adjacent to each other;
  a first side panel and a second side panel, wherein the first side panel is attached within a first hollow space defined by the first base sled, and the second side panel is attached within a second hollow space defined by the second base sled; and
  a grabber head disposed between the first base sled and the second base sled, wherein the grabber head is attached, at an attachment end, to the first side panel and the second side panel, and wherein the grabber head comprises a first hook and a second hook, and
wherein the connection rod is disposed between the first base sled and the second base sled, wherein the connection rod is attached to the first side panel and the second side panel,
wherein the method further comprises catching the line on the seafloor with the grabber head,
wherein the grabber head comprises a neck portion that is disposed between the first hook and the second hook,
wherein the method further comprises securing the line after it is caught with either a first swing arm or a second swing arm,
wherein the first swing arm is attached to the attachment end and extends along one side of the neck portion,
wherein the second swing arm is attached to the attachment end and extends along another side of the neck portion,
wherein the first swing arm is configured to open and close an opening defined by the first hook of the grabber head, and
wherein the second swing arm is configured to open and close another opening defined by the second hook of the grabber head.

6. The method according to claim 5, wherein the marine clutch is made of iron.

7. The method according to claim 5,
wherein the marine clutch comprises a first bolt that threads through a hole defined by a clutch attachment end of the connection rod, and
wherein the first bolt is fastened to the first side panel and the second side panel.

8. The method according to claim 5,
wherein the marine clutch comprises a second bolt,
wherein the second bolt is threaded through a hole defined by the attachment end of the grabber head, and
wherein the second bolt is fixed to the first side panel and the second side panel.

9. A method of assembling a marine clutch, comprising:
connecting a first base sled with a second base sled, wherein the first base sled and the second base sled are connected adjacent to each other;
attaching a first side panel within a first hollow space defined by the first base sled;
attaching a second side panel within a second hollow space defined by the second base sled;
attaching a joint structure to a face of the first side panel and to a face of the second side panel;
attaching a connection rod to the first side panel and the second side panel, wherein the connection rod is attached between the first base sled and the second base sled; and
attaching a grabber head to the first side panel and the second side panel,
wherein the grabber head is attached between the first side panel and the second side panel,
wherein the grabber head comprises a first hook and a second hook, and
wherein the grabber head is attached to the first side panel and the second side panel at an attachment end of the grabber head,
wherein the grabber head comprises a neck portion that is disposed between the first hook and the second hook,
wherein the method further comprises:
  attaching a first swing arm to the attachment end, the first swing arm extending along one side of the neck portion; and
  attaching a second swing arm to the attachment end, the second swing arm extending along another side of the neck portion,
wherein the first swing arm is configured to open and close an opening defined by the first hook of the grabber head, and
wherein the second swing arm is configured to open and close another opening defined by the second hook of the grabber head.

10. The method according to claim 9, wherein the marine clutch is made of iron.

11. The method according to claim 9, wherein the method further comprises:
threading a first bolt through a hole defined by a clutch attachment end of the connection rod; and
fastening the first bolt to the first side panel and the second side panel.

12. The method according to claim 9, wherein the method further comprises:
fixing a second bolt to the first side panel and the second side panel,
wherein the second bolt is threaded through a hole defined by the attachment end of the grabber head, and
wherein the second bolt is fixed to the first side panel and the second side panel.

* * * * *